UNITED STATES PATENT OFFICE.

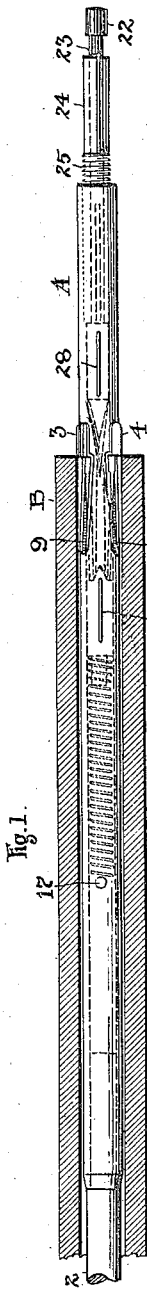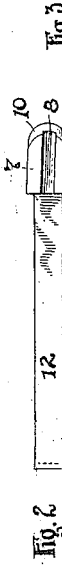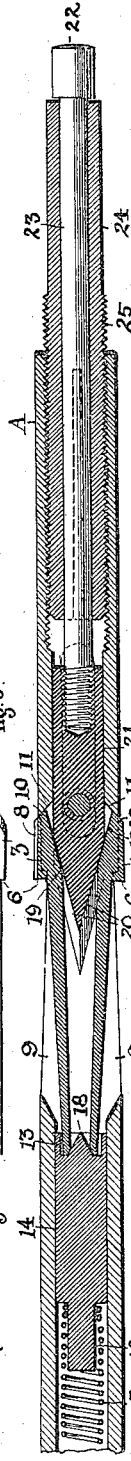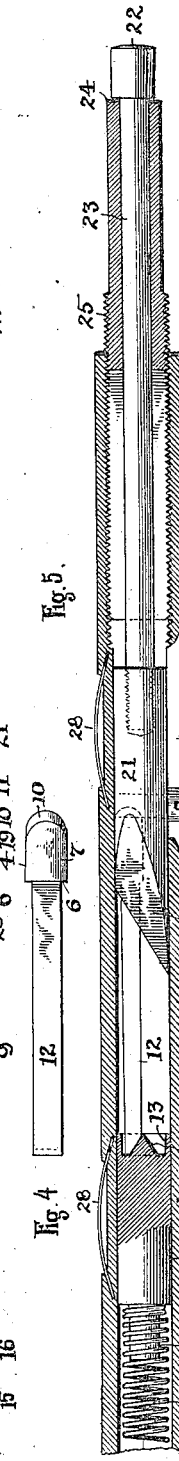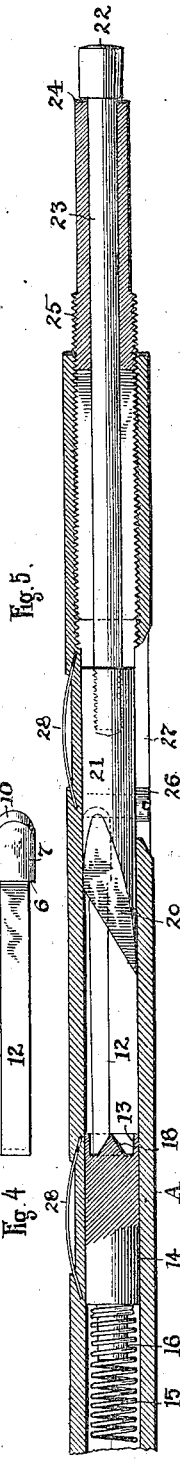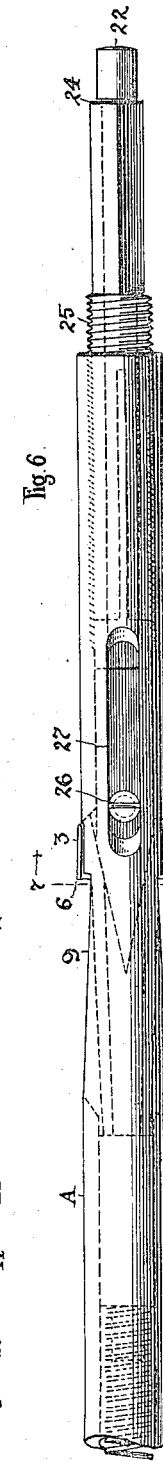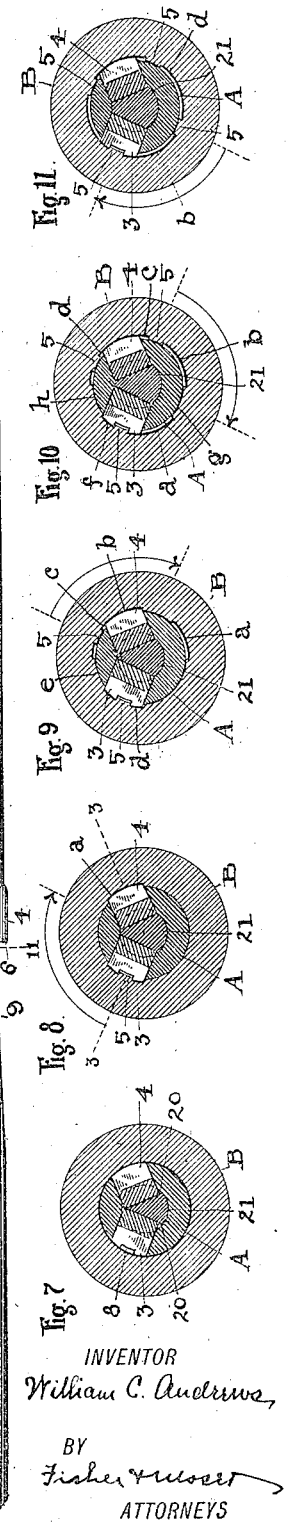

WILLIAM C. ANDREWS, OF CLEVELAND, OHIO, ASSIGNOR TO HARRY A. AUER, OF CLEVELAND, OHIO.

CUTTING-TOOL.

1,239,659.  Specification of Letters Patent.  Patented Sept. 11, 1917.

Application filed January 21, 1916.  Serial No. 73,355.

*To all whom it may concern:*

Be it known that I, WILLIAM C. ANDREWS, citizen of the United States, residing at Cleveland, in the county of Cuyahoga and State of Ohio, have invented certain new and useful Improvements in Cutting-Tools, of which the following is a specification.

My invention relates to cutting tools, and comprises an improved tool for cutting and rifling gun barrels, substantially as herein shown and described and more particularly pointed out in the claims.

In making gun barrels, the general practice is to rough-bore the barrel; then to ream the bore to the desired diameter, using a rotary reamer; and next to rifle the barrel. Reaming operations involve time and labor and produce cross cuts on the spiral lands or ribs within the bore. My object is to provide a cutting tool adapted to rifle the barrel in its roughly-bored state, dispense with the reaming operations, and avoid cross cutting entirely, the rifling of the bore and the finishing of the lands being accomplished entirely with a single tool and by longitudinal draw-cutting operations, thus effecting a saving in time and labor and producing a materially improved product.

In the accompanying drawings, Figure 1 is a plan view of my improved cutting tool or rifling head (full size) inserted within a portion of a gun barrel shown in longitudinal section. Fig. 2 is a side or face view of the rifling cutter (double size) which is adapted to produce and finish the rifling lands or ribs. Fig. 3 is an enlarged longitudinal section of the tool along on substantially line 3—3, Fig. 8. Fig. 4 is an enlarged side or face view of the grooving cutter, Fig. 5 is a longitudinal vertical section of the tool, approximately twice its original size, this view being at right angles to Fig. 3. Fig. 6 is a bottom view of the tool. Figs. 7 to 11, inclusive, are cross sections of a gun barrel and the tool on line 7—11, Fig. 6, showing various stages in rifling operations, as hereinafter more fully described.

The tool comprises a cylindrical head —A— which is of slightly smaller diameter than the rough-bore of the gun barrel B so as to move freely therein, and this head is tubular and affixed upon one end of a rod 2 by sweating or otherwise so that it may be rotated and reciprocated in rifling operations, actuation of the rod being by automatic mechanism usually. That is, the device is adapted to be used in a machine for rifling gun barrels when the barrel is held stationary while cutting proceeds and also rotated a definite number of degrees at intermittent intervals while the cutting head is projected out of the barrel, such operation being for the purpose of producing a series of grooves and lands within the barrel according to any desired or accepted standard. For example, the present tool is designed more especially to produce four grooves and lands, and the rod 2 is reciprocated and rotated automatically by the machine to produce a spiral cut, the cutting head A being given one revolution in approximately each ten inches of longitudinal travel thereof throughout the length of the gun barrel while the barrel remains fixed and stationary. Each spiral cut is obtained by drawing the tool through the barrel, then collapsing the cutters and returning the tool through the barrel to repeat the operation. Four such draw cutting movements of my tool and four rotative movements of ninety degrees each of the barrel produce four rifling channels of the same depth but this depth is only a fraction of the depth required as it is not desirable nor practicable to cut each channel the full depth in a single draw cut, notwithstanding that the full depth of such a channel is usually only several thousandths of an inch. Consequently, repeated draw cuts are made until the channels are of the required depth, and to do this the cutters are expanded automatically subsequent to each complete revolution of the gun barrel and following the fractional cutting of four channels successively to the same depth. The number of times that such operations are repeated is dependent upon the number and depth of the rifling channels desired, but the last series of longitudinal movements of my improved tool cut and finish the lands as well as the channels and leave no cross or irregular cuts in any portion of the barrel as frequently occurs where reaming operations are involved.

To accomplish these results my improved tool is distinguished from other tools known to me in that a pair of hook cutters 3 and 4 are used and related in a particular way so that a double cut is made in each draw stroke of the cutting head A and overlapping cuts as well in successive draw strokes, all without injury to the lands 5 produced in the barrel by such cuts. To explain further, the cutters 3 and 4 are of equal width and have each a transverse draw cutting edge 6 which is adapted to be honed as in any ordinary cutting tool. The cutting edge 6 and the transverse face 7 of each cutter is in the form of a circular segment conforming to the extreme diameter of bore desired and the width of such cutters is more or less dependent upon the width of the lands 5 or the number of lands to be produced. Cutter 3 in my tool determines the width of the land 5 to be made as the face 7 thereof is provided with a longitudinal channel 8 corresponding in width to the land to be made. This channel extends into the vertical or undercut shoulder which produces the cutting edge 6 and which edge in cutter 3 is thus necessarily stepped and of the same outline as the channeled surface 7. Thus, the end edge at the base of the channel provides a land planing edge relatively nearer the center of the tool than the groove cutting edges of either cutter. Compared therewith cutter 4 is plain or of regular curvature, and it must also be noted that these two cutters are confined within longitudinal slots 9 placed approximately one-hundred and thirty five degrees apart measured center to center radially of the head A. Each cutter has a semi-circular beveled end 10 to engage the undercut end 11 of its corresponding slot 9, and a reduced stem 12 for each cutter extends lengthwise of each slot into bearing engagement with the socket end 13 of a spring-pressed plunger 14 which is adapted to slide within the round opening extending centrally through cylindrical head A. The coiled spring 15 which is sleeved over the reduced extension 16 of plunger 14 is backed by a cross pin 17 in head A, and a conical projection 18 is provided centrally within the socket end 13 of the plunger to hold the cutter stems 12 centrally in place. Each cutter member is also provided with a beveled face 19 opposite its cutting face 7, and these beveled faces 19 are opposed and engaged by the corresponding beveled surfaces 20 of a wedge member 21 reciprocally confined within the smooth round opening within the head A. An inward movement of wedge member 21 expands the cutters uniformly, that is, forces them outward radially of the head notwithstanding the resistance offered by the end seating relations of each cutter with the undercut ends 11 of slots 9. Such resistance is overcome by the end thrust upon said cutter members and the yielding action of the spring-pressed plunger 14. The inward movement of wedge member 21 is limited by an enlargement 22 on the outer end of the round operating stem 23 striking the squared extremity 24 of a split screw plug 25 which is adjustable longitudinally within the screw-threaded end of head A, and the inner extremity of this screw plug limits the outward or retiring movement of the wedge member 21 relatively to the cutters when these are to be collapsed for the return or idle stroke of head A. The outward movement of wedge member 21 is effected by a projecting pin or screw 26 located at the bottom of member 21 when a suitable stop or operating part in the machine is reached and engaged during reciprocal movements of the tool. This screw 26 works back and forth in a longitudinal slot 27 at the bottom of head A and functions also to hold wedge member 21 from turning within the head. Undue play or looseness of head A is prevented within the bore of the gun barrel B during cutting operations by means of a pair of wire bow springs 28 socketed at their ends within oppositely-inclined holes within the upper sides of the cylindrical head A. One end of each bow spring 28 is shorter than its hole to permit longitudinal movement therein when the bow portion is compressed and flattened by engagement with the gun barrel, and the outer surface of head A is cut away beneath each spring to permit a free spring action and a complete retirement of the spring when under close confinement.

It should be noted also that the head A bears directly against the bottom of the bore of the gun barrel at a point directly opposite the bow springs 28, and that the cutters diverge at equal distances from this central vertical line of engagement and necessarily divide the cutting pressure equally and produce a uniform depth of cut at both places within the top or opposite side of the gun barrel.

Now referring to Figs. 7 to 11, these views illustrate a series of steps in rifling a gun barrel with my improved tool, whereby four spiral grooves and lands are produced, but it must be understood that complete rifling is not performed in the single series of steps illustrated but that substantially the same cycle of operations is repeated many times to obtain the full depth of cut of the grooves and the finished lands. Thus beginning with the gun barrel in its roughly bored state and omitting the usual step of reaming the bore, I insert my rifling head or tool A within the gun barrel.

Obviously, the cutters 2 and 3 must be collapsed to pass the head through the bore of the barrel, a condition and relationship of parts illustrated in Fig. 7. Then the head A is projected more or less beyond the end of the barrel, say substantially as shown in Fig. 1, and the cutters 2 and 3 set and positioned to produce the first light cut while the gun barrel is held stationary and the rod 2 reciprocated and rotated by the usual means found in any ordinary rifling machine. This first light cut is relatively not as deep as shown in Fig. 8, but this view serves to illustrate the operation, which consists in grooving the bore of the barrel the width of each cutter in two places approximately one-hundred and thirty five degrees apart radially of the barrel, cutter 3 at the left leaving a land portion 5 centrally by reason of the longitudinal channel 8 therein, and cutter 4 at the right forming a groove —a— the full width of the cutter. Cutting at this depth proceeds the full length of the barrel by drawing the head A through the barrel while rotating the head the desired number of times to produce a spiral cut as usual. At the end of this movement, the cutters are collapsed by retiring the wedge member 21 and the head A returned to the opposite end of the gun barrel for the next cut, which does not begin however until the barrel B has been given a quarter turn as indicated by the arrow in Fig. 8 and which turned position of the barrel is shown in Fig. 9. Head A and the cutters always come to the same starting position and the cutters are expanded in the same degree as before to produce a cut of the same depth as the first, such expansion of the cutters occurring by engagement of the stem enlargement 22 with a stop on the machine and the resultant inward movement of wedge member 21 until the enlargement 22 strikes the outer end of the screw plug 25.

With the parts related in this way a second cutting action proceeds as before, the position of cutter 4 at the right producing a second wide groove b in the barrel at a point intermediate the first made land portion 5 and the first made wide groove a and it should be noted that cutter 4 is wide enough and the turned position of the barrel sufficient to cause cutter 4 to overlap the right border of the divided groove which had been cut previously by cutter 3 and that the land portion 5 centrally within said divided or double cut C by cutter 3 is cleared by a safe margin from cutter 4 during the second cutting step as shown in Fig. 9. Manifestly, this second cutting step involves the production of a second land portion 5 and a divided or double groove d by cutter 3 at the left, see Fig. 9.

The reciprocal movements of head A and the collapsing and expanding movements of the cutters being understood, suffice to say that the third cutting step of the cutters is illustrated in Fig. 10, a position of parts established by rotation of the gun barrel ninety degrees in the direction shown by the arrow in Fig. 9 and from the position of the barrel in that figure to the advanced position in Fig. 10. Here the land portion 5 of the divided groove c is advanced safely beyond the reach of cutter 4 and the newly-made land portion 5 centrally in the divided groove d is also clear of said cutter 4 while at the same time said cutter is in overlapping cutting relations with both grooves c and d to remove the stock completely between the land portions, the stock removed by cutter 4 being indicated at e in Fig. 9. A third land portion 5 and divided groove f is also being cut by cutter 3 while this stock e is being removed by cutter 4, and cutter 3 now produces an overlapping cut also at one border of the groove a where it has been advanced within the reach of said cutter 3, see Fig. 10. Three land portions 5 have been clearly defined and cut to their final width at this stage of operations, and a segment of stock g has been left undisturbed between grooves a and b, (see Fig. 10,) from which the fourth land portion is produced in the next or fourth cutting step, (see Fig. 11,) where the barrel B has been given its last quarter turn following the completion of the cutting step shown in Fig. 10. In Fig. 11, all four land portions 5 are shown and all the stock removed between such land portions to a uniform depth, cutter 4 in this last stage serving to remove the stock designated by h in Fig. 10, and the cutter 3 removing the surplus stock g at each side of the fourth land portion 5 as explained. Now in all these successive steps or cycle of operations for producing the four lands and a fractional cut of uniform depth between the lands, the circular surface of each land defined by the rough bore of the gun barrel has not been engaged or cut by the cutting edge 6 at the base of the channel 8 in cutter 3, and it is not until these series of steps or cycle of operations have been repeated and the full depth or substantially the full depth and final cuts have been reached that such land surfaces are cut and finished by cutter 3. To reach this depth, the cutters 3 and 4 are expanded by degrees after each cycle of operations as defined by four successive rotations of barrel B, such expansion being effected by a partial rotation of screw plug 25 through its squared extremity 24 and a step by step inward movement of wedge member 21. The machine using this tool is designed to have means to engage and rotate the screw plug 25 the required degree and when needed, but the feed may be produced by hand.

In fact, the machine operating parts for the tool form no part of the present invention and have only been referred to to make the operation of the tool more clear and to bring out the advantages of the tool. Attention is also called to my application for patent Serial Number 141,744, filed January 11, 1917, for a method of producing a gun barrel. Morover, the inventive concept may be carried forward into other modified forms of the tool to produce the same number or a different number of rifled lands, the scope of the invention being defined by the following claims:

What I claim is:

1. In a cutting tool for rifling and finishing the bore of a gun, a cylindrical head having a draw cutter provided with stepped faces terminating in curved cutting edges of different radii, said cutter projecting radially outward from said head to produce an internal longitudinal groove and a land of predetermined width and curvature in the same draw movement of the tool through a gun barrel.

2. In a cutting tool for rifling and finishing the bore of a gun, a cylindrical head having a set of cutters radially mounted therein to produce overlapping cuts internally of the gun barrel in successive cutting operations and different settings of the gun barrel, one of said cutters having a continuous cutting edge and the other cutter having a stepped cutting edge adapted to finish the lands during the final stages of rifling operations.

3. In a cutting tool for rifling and finishing the bore of a gun, a cylindrical head having a set of cutters projecting outwardly and radially disposed therein, one of said cutters having a curved cutting edge adapted to produce a groove internally of said barrel and the other cutter having a cutting edge disposed relatively nearer the center of the tool than said first cutting edge to finish the land portions between the cut grooves.

4. In a cutting tool for rifling and finishing the bore of a gun, a cylindrical head having a set of cutters oppositely disposed therein on diverging radial lines, one of said cutters being provided with a continuous cutting edge adapted to produce a plain groove internally of said barrel and the other cutter having a stepped cutting edge adapted to produce a double groove and finish the land between the double grooves.

5. In a cutting tool for rifling and finishing the bore of a gun, a cylindrical head having a set of draw cutters mounted therein on diverging radial lines, one of said cutters having a channeled surface and irregular cutting edge and the other cutter having a cutting edge of regular curvature, said cutters being adapted to produce a series of radial grooves and lands and to finish the lands within the bore of the gun.

6. In a tool for cutting and rifling the bore of a gun, a cylindrical head, a draw cutter mounted radially within said head having a longitudinal channel centrally therein and an irregular cutting edge involving concentric arcs of different radii to produce a curved land portion and a curved groove at each side of said land portion within a gun barrel, and means to expand said cutter outwardly of said head.

7. In a tool for cutting and rifling the bore of a gun, a cylindrical head, a pair of cutters mounted on radial lines within said head and having curved cutting edges transversely disposed at different distances from the center of the tool, a reciprocable spreader member for said cutters, and adjustable means to limit the reciprocable movements of said members.

8. In a tool for cutting and rifling a gun, a slotted head and a set of hook cutters mounted therein, one of said cutters having a cutting portion adapted to produce a longitudinal groove, and the other cutter being offset radially to said first cutter and having a cutting portion adapted to finish the land at the side of the groove in the same draw cutting operation, and means for intermittently expanding the cutters outwardly from said head.

9. In a tool for cutting and rifling a gun, a tubular head, a pair of raidally-movable cutters mounted opposite each other within the sides of said head, a wedge member to engage said cutter, and a spring-pressed plunger having an annular socket at its end to seat one end of each cutter.

10. In a tool for cutting and rifling a gun, a tubular head, a pair of oppositely-related hook cutters each having a stem longitudinally disposed in the side of said head, a wedge member in spreading and end-thrust engaging relations with said cutter, and a spring-pressed plunger having a central cone and annular socket in its end adapted to separate and seat said cutter stems.

11. In a tool for cutting and rifling a gun, a tubular head having a set of cutters mounted in its side on diverging radial lines, a spring projected from said head on a radial line between said cutters and free to flex inwardly in cutting operations and means to expand said cutters.

12. In a tool for cutting and rifling a gun, a tubular head having a pair of radially-movable cutters mounted upon the exterior of said head and a free-flexing spring rearwardly and forwardly of and on a median line relatively to said cutters, and means to expand said cutters.

13. A tool for rifling and planing a gun from a roughly-bored state to a predetermined caliber, comprising a cylindrical member having a hook cutter adapted to produce a groove by repeated draw cutting operations and a land planing element adapted to finish a land portion adjacent the groove during final draw cutting operations, said groove cutter having its groove cutting edge farther from the center of the tool than the cutting edge of said planing element.

14. A tool for rifling and planing a gun from a roughly-bored state to a predetermined caliber, comprising a cylindrical member having a hook cutter adapted to produce a groove by repeated draw cutting operations and a planing element adapted to finish a land portion adjacent the groove during final draw cutting operations, and adjustable means to station said groove cutter and land planing element with their respective groove cutting and planing edges at different distances radially from the axis of the tool.

15. A tool for rifling a gun in a roughly bored state and planing the bore to a predetermined caliber, comprising a body having a plurality of adjustable cutters provided with cutting edges relatively positioned on different radial lines and different distances from the axis of the tool, and means adapted to spread said cutters to produce a groove initially and to finish a land adjacent said groove during final steps of groove cutting operations.

16. In a tool for rifling and planing a gun from a roughly bored state to a predetermined caliber, a radially slotted body, a groove cutter and a land planer mounted radially in the slots of said body, said groove cutter having a cutting edge removed a greater distance from the center of the tool than the planing edge of the said planer, means to move said cutter and planer radially outward, and an adjustable stop for said means.

In testimony whereof I affix my signature in presence of two witnesses.

WILLIAM C. ANDREWS.

Witnesses:
F. C. HARROLD,
GEO. E. KRICKER.

Copies of this patent may be obtained for five cents each, by addressing the "Commissioner of Patents, Washington, D. C."